US006769152B1

(12) United States Patent
Crenshaw et al.

(10) Patent No.: US 6,769,152 B1
(45) Date of Patent: Aug. 3, 2004

(54) LAUNCHER FOR PASSING A PIG INTO A PIPELINE

(75) Inventors: Doyle J. Crenshaw, Booneville, AR (US); Floyd T. Parnell, Booneville, AR (US)

(73) Assignee: Parnell Consultants, Inc., Booneville, AR (US)

( * ) Notice: Subject to any disclaimer, the term of this patent is extended or adjusted under 35 U.S.C. 154(b) by 20 days.

(21) Appl. No.: 10/174,684

(22) Filed: Jun. 19, 2002

(51) Int. Cl.[7] .................................................. B08B 9/055
(52) U.S. Cl. ..................................... 15/104.062; 15/3.5
(58) Field of Search ............................... 15/3.5, 104.062

(56) References Cited

U.S. PATENT DOCUMENTS

| | | | |
|---|---|---|---|
| 3,028,996 A | | 4/1962 | Ellett |
| 3,076,509 A | * | 2/1963 | Burns et al. |
| 3,081,472 A | | 3/1963 | Van Dijk |
| 3,631,555 A | | 1/1972 | Hurst et al. |
| 4,132,243 A | * | 1/1979 | Kuus |
| 4,709,719 A | | 12/1987 | Littleton et al. |
| 5,113,895 A | | 5/1992 | Le Devehat |
| 5,139,576 A | | 8/1992 | Davis |
| 5,884,656 A | | 3/1999 | Smith |
| 5,913,637 A | | 6/1999 | Rajabali et al. |
| 5,967,699 A | | 10/1999 | Knapp |
| 6,022,421 A | | 2/2000 | Bath et al. |
| 6,079,074 A | | 6/2000 | Ellett |
| 6,286,540 B1 | | 9/2001 | Bonicontro |
| 2002/0116776 A1 | * | 8/2002 | Stracke et al. |

FOREIGN PATENT DOCUMENTS

SU         0856600      *   8/1981

* cited by examiner

Primary Examiner—Randall Chin
(74) Attorney, Agent, or Firm—Gable & Gotwals; Paul H. Johnson

(57) ABSTRACT

An improved pipeline pig launcher method and use thereof for conveying a pig into a pipeline including an upright launch barrel having a lower end in communication with the pipeline, a valve affixed to an upper end of the launch barrel and having a full diameter passageway therethrough, an upright pig receiving chamber connected at a lower end to the valve and in vertical alignment with the valve and launch barrel, and a cover removably closing an upper end of the receiving chamber providing, when in an open position, provision for insertion of a pig so that when said valve is open, the pig can pass downwardly into the launch barrel and from there into the pipeline.

9 Claims, 5 Drawing Sheets

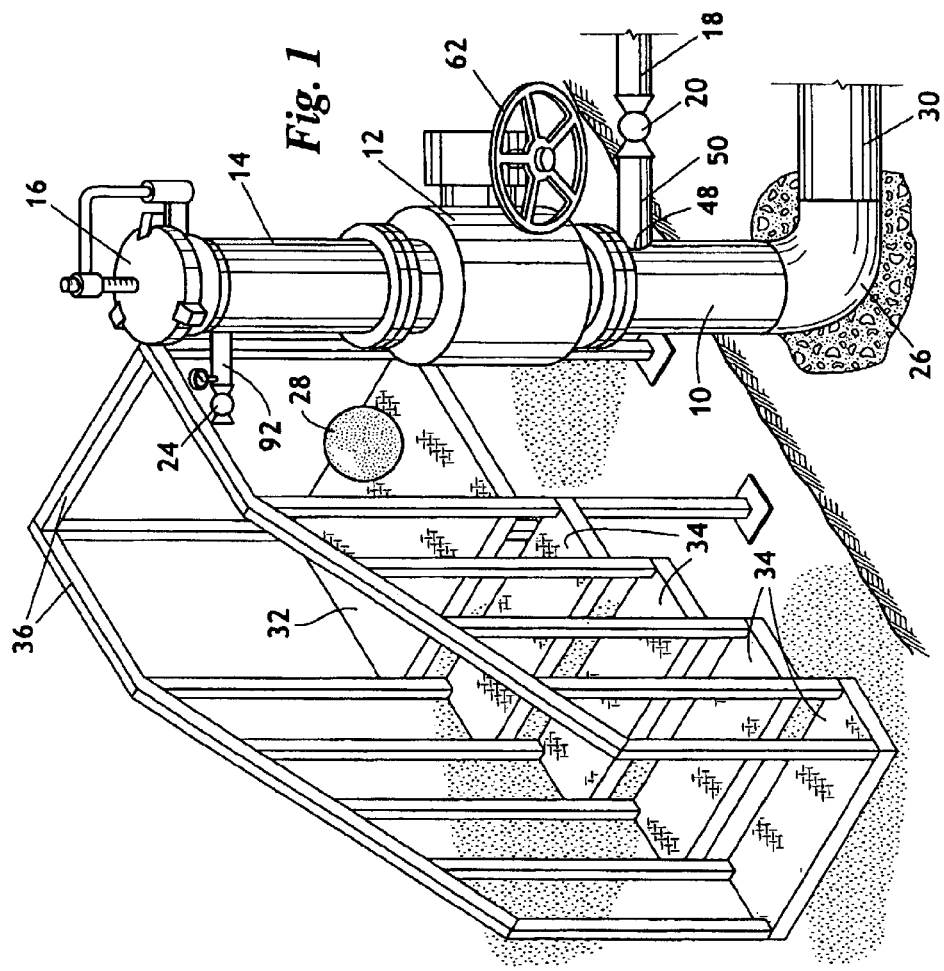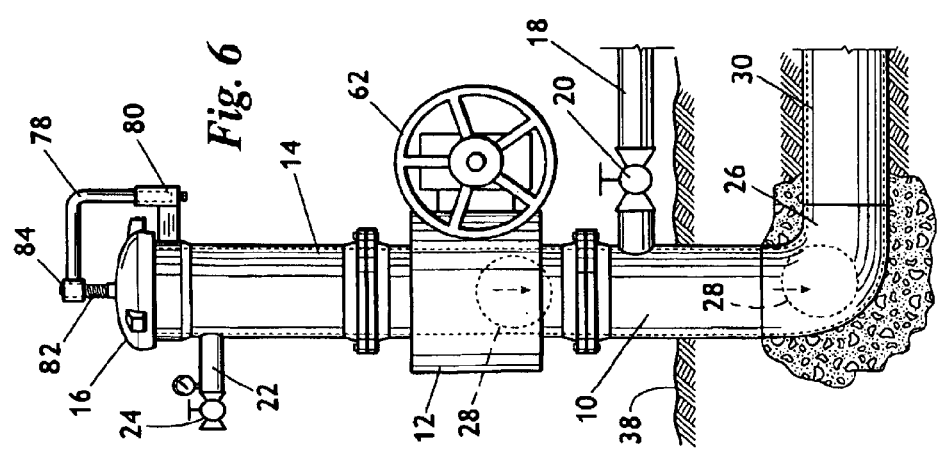

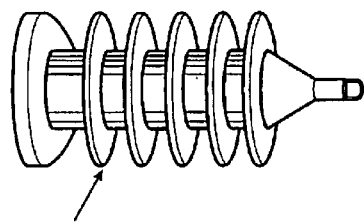
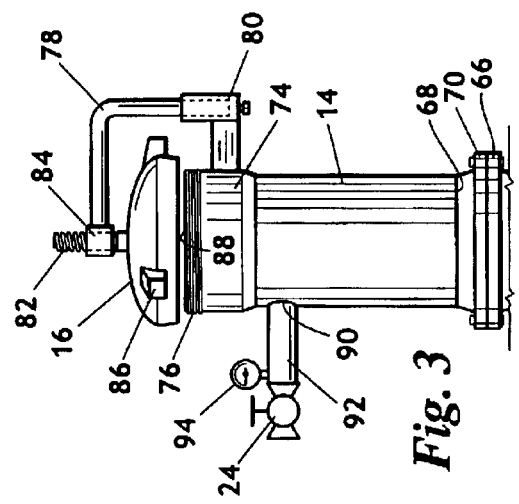
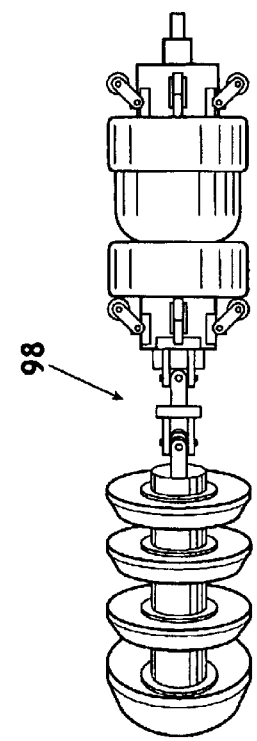
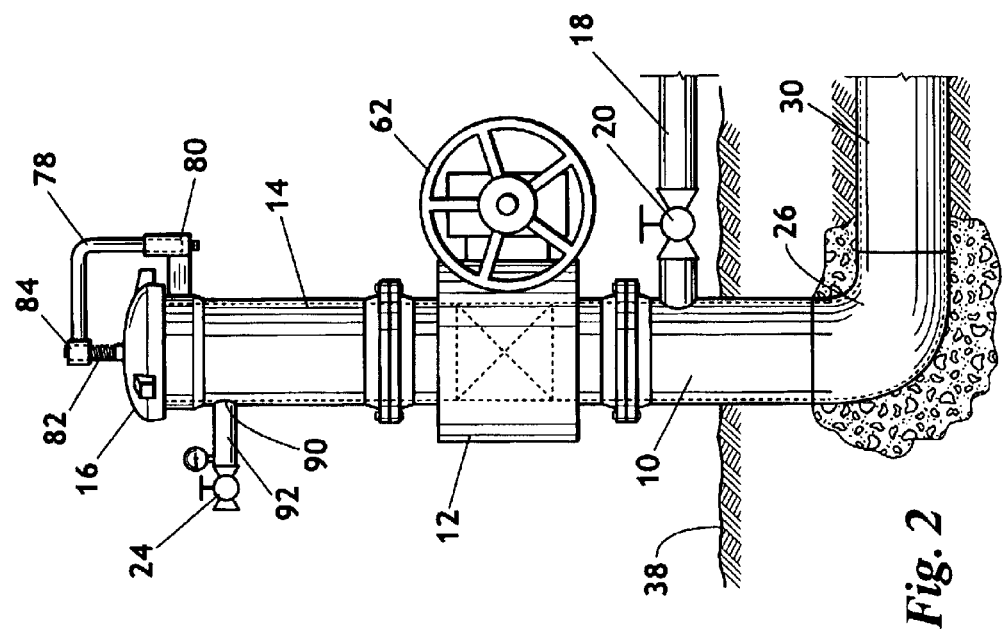

LAUNCHER FOR PASSING A PIG INTO A PIPELINE

REFERENCE TO PENDING APPLICATIONS

This application is not based upon any pending domestic or international patent applications.

REFERENCE TO MICROFICHE APPENDIX

This application is not referenced in any microfiche appendix.

FIELD OF THE INVENTION

The present invention is a launcher for conveying a pig into a pipeline employing an upright launch barrel having a lower end in communication with the pipeline, a valve affixed to an upper end of the launch barrel, having a passageway therethrough that can be closed or open and when in the open position allows a pig to pass in an upright receiving chamber connected at its lower end to the valve in vertical alignment with the valve and launch barrel and a cover closing an upper end of the receiving chamber.

BACKGROUND OF THE INVENTION

Pipeline pigs are used for several different reasons in the operation of pipelines. Pipelines can be relatively short such as for use in connecting a producing field to a refinery, but typically pipelines extend for many miles, sometimes on the earth's surface but usually under the surface. In addition, pipelines frequently pass under bodies of water such as to cross-rivers and lakes. Much of today's crude oil production takes place offshore—that is, from wells produced by use of drilling platforms. Pipelines are required to transport crude oil produced in these offshore wells to land locations where refineries are located or where shipping facilities are available.

Wells that produce gas or crude oil typically also produce water. Since water is denser than gas or hydrocarbon fluid, it tends to accumulate in low places in a pipeline and can interfere with the successful operation of the pipeline. For this reason, it is important that water be periodically removed from a pipeline which is most effectively accomplished by passing pipeline pigs through the pipeline to force the water in front of the pigs as the pigs move through the pipeline to thereby carry the water out of the pipeline and to a slop tank to be carried away for disposal.

Further, crude oil, and including water produced in conjunction with crude oil, frequently includes insoluble components such as sand, rust and so forth that tends to settle in low places in a pipeline. These insoluble contaminants must occasionally be removed from a pipeline; otherwise they can accumulate to the point where they interfere with flow of liquids or gasses through the pipeline.

Further, it is well known that the interiors of pipelines can become coated with paraffin and other contaminates and therefore it is necessary to occasionally pass pigs through a pipeline to remove contaminates that have adhered to the pipeline interior wall.

Another reason for employing pipeline pigs is to separate one component from another. If a pipeline is used to transmit more than one kind of fuel, such as gasoline and diesel fuel, a pig can be used to separate one component from another. This requirement is sometimes referred to as "batching." Instrument pigs are also frequently employed to gather information about the condition of a pipeline. These are just examples of the various reasons that the operation of pipelines require the passage of pigs through pipelines.

Various devices have been created for injecting a pig into a pipeline and for background information relating to pig launching devices, reference may be had to the following previously issued United States Patents:

| U.S. Pat. No. | Inventor(s) | Title |
| --- | --- | --- |
| 3,028,996 | Ellett | Injector for Pipe Cleaning Balls |
| 3,081,472 | Van Dijk | Automatic Injector for Pipeline Cleaners |
| 3,631,555 | Hurst/Linz | Tube-Cleaning Pellet Gun |
| 4,709,719 | Littleton, et al. | Automatic Cup Pig Launching and Retrieving System |
| 5,113,895 | Le Devehat | Three Way Valve and Distribution Pipe Comprising Same, Both Adapted to be Cleaned by Scraping |
| 5,139,576 | Davis | Method and a Horizontal Pipeline Pig Launching Mechanism for Sequentially Launching Pipeline |
| 5,884,656 | Smith | Pig Launcher |
| 5,913,637 | Rajabali, et al. | Automatic Pipeline Pig Launching System |
| 5,967,699 | Knapp | Method and Apparatus for Launching a Pig in a Vertical Riser Pipe |
| 6,022,421 | Bath, et al. | Method for Remotely Launching Subsea Pigs in Response to Wellhead Pressure Change |
| 6,079,074 | Ellett | Pipe Pig Injector |
| 6,286,540 | Bonicontro | Pig or Sphere Thrower |

BRIEF SUMMARY OF THE INVENTION

The present invention satisfies the needs discussed above. The present invention provides a method and system for launching a pig into a pipeline. The system includes an upright launch barrel having a lower end in communication with the pipeline that is to receive the pig. A fully ported valve is affixed at an upper end of the launch barrel. The valve has a passageway therethrough that can be closed or opened and when in the open position is of internal diameter at least equal to the external diameter of the pig to be launched. That is, the valve is a fully ported type that when open freely allows the pig to pass downwardly therethrough.

An upright pig receiving chamber is connected at a lower end to the valve and in vertical alignment with the valve—that is, the receiving chamber extends vertically upwardly from an upper end of a fully ported valve. The upright receiving chamber is in coaxial vertical alignment with the valve and the launch barrel. The pig to be launched is assumed to have a diameter "D" and the launch barrel, the fully ported valve, and the receiving chamber all have internal diameters greater than "D" so that a pig to be launched freely passes downwardly through these three components without restriction and only with the affect of gravity.

A cover is removably attached to an upper end of the receiving chamber for selectively closing or opening the receiving chamber. When the cover is in open position, the upper open end of the receiving chamber is open so that a pig to be launched can be inserted—that is, dropped into the receiving chamber. After a pig is dropped into the receiving chamber, the cover is closed in a pressure tight arrangement.

A fluid supply conduit is connected to a fluid entry port formed in the upper portion of the launch barrel below the fully ported valve. The fluid supply conduit is controlled by a fluid control valve that may be of relatively small size compared to the fully ported valve that exists between the receiving chamber and the launch barrel.

A pressure relief port is provided in the receiving chamber and is closed by a relatively small pressure relief valve. When the pressure relief valve is opened, pressure within the receiving chamber is equalized with atmospheric pressure, meaning that it is safe to open the cover of the receiving chamber.

The launcher of this invention is used in this manner: With the fully ported valve closed, the pressure relief valve is opened to equalize pressure within the receiving chamber. When the pressure is equalized, the cover is opened exposing the open end of the vertical receiving chamber. A pipeline pig can then be placed into the receiving chamber. The receiving chamber is, as previously stated, of internal diameter greater than the external diameter of the pipeline pig so the pipeline pig will by gravity pass downwardly within the receiving chamber to the lower end and rest on the closed fully ported valve. The cover is then placed in position on the upper end of the receiving chamber and the pressure relief valve closed. The launch system then is in ready position so that when required, the pig that is within the receiving chamber can be launched when desired.

To launch the pig, the fully ported valve is fully opened allowing fluid pressure to equalize between the lower launch barrel and the upper receiving chamber. When the pressure is equalized, which occurs very quickly when the fully ported valve is open, the pig is free to pass through the fully ported valve and into the launch barrel. The pig falls to the lower end of the launch barrel where a reducing ell is encountered. The reducing ell reduces in internal diameter from that of the launch barrel to essentially that of the internal diameter of the pipeline in which the pig is to be placed. The pig therefore passes into the ell and is in a position to enter the reduced portion of the ell and ultimately into a pipeline. To move the pig from the reducing ell at the lower end of the launch barrel, fluid is directed into the upper end of the launch barrel under pressure. This high pressure fluid is supplied by a fluid supply conduit and controlled by a fluid control valve. When the fluid control valve is open, the pressure within the launch barrel builds to the point that the pig is forced from the reducing ell into the pipeline. Once in the pipeline, the pig is carried by fluid flow in the pipeline.

The pig launcher can thus be repeatedly used. It is simple in operation and requires no mechanical device to move a pig from a ready position into a pipeline.

A better understanding of the invention will be obtained from the following detailed description of a preferred embodiment, taken in conjunction with the attached drawings.

BRIEF DESCRIPTION OF THE DRAWINGS

FIG. 1 is an isometric view of a pig launcher of this invention showing the basic components that extend upwardly from the earth's surface and showing a stairwell positioned adjacent to the pig launcher that can be used by an operator to position himself or herself so as to easily place a pig into the open upper end of a receiving chamber.

FIG. 2 is an elevational view of the pig launcher of FIG. 1 showing a portion of the launcher barrel below the earth's surface connected with a reducing ell and to a pipeline in which the pig is to be employed.

FIG. 3 shows more details of the upper portion of the receiving chamber, a cover that removably closes the receiving chamber, a pressure relief system and a pressure relief valve.

In FIG. 2 the cover is in closed position at the upper end of the receiving chamber whereas FIG. 4 shows the cover completely removed and shows a spherical pig as it is placed into the upper open end of the receiving chamber.

FIG. 6 is an elevational view of the pig launcher showing the arrangement wherein a pig has been placed into the receiving chamber and the fully ported valve open to allow the pig to pass downwardly from the receiving chamber into the launch chamber and showing the sequence of positions as the pig moves downwardly into the reducing ell at the lower end of the launch barrel.

FIG. 8 illustrates a type of pipeline pig known generically as a "smart pig," that is, a pipeline pig that gathers information about the pipeline as it is moved by fluid flow through the pipeline.

FIG. 9 illustrates a multiple disc plastic or elastomeric pipeline pig of a type frequently used in pipeline operations. FIGS. 8 and 9 illustrate the fact that the launcher of this disclosure may be used to launch multiple types of pipeline pigs.

DETAILED DESCRIPTION OF THE PREFERRED EMBODIMENTS

Figure 4:
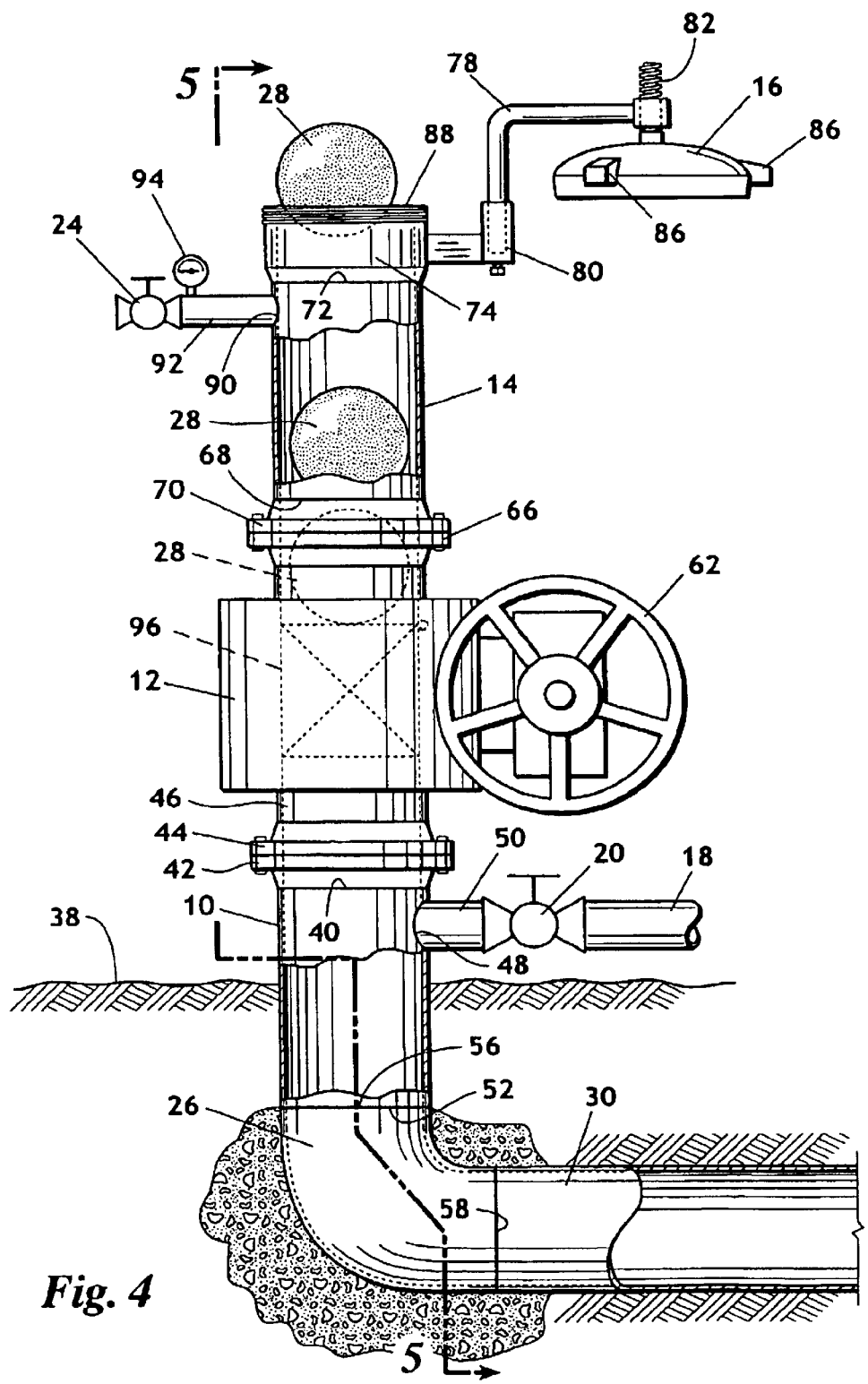
FIG. 4 is an elevational plane view of the pig launcher similar to the elevational view in FIG. 2.
Figure 5:
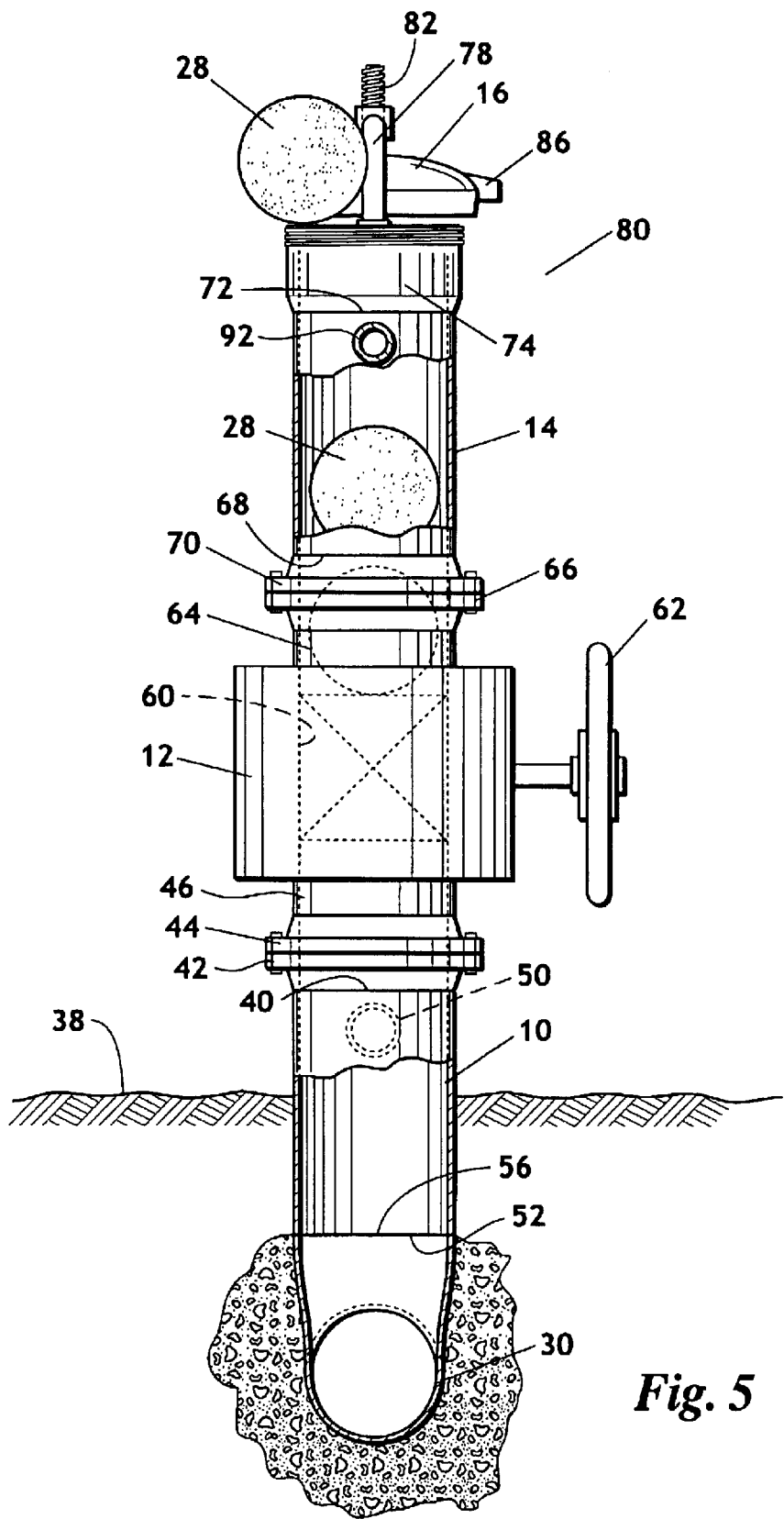
FIG. 5 is an elevational side view of the pig launcher as shown in FIG. 4 with the cover removed and showing the sequential positions of a pig placed into the launcher.

It is to be understood that this invention of this disclosure is not limited to the details of construction and arrangement of parts illustrated in the accompanying drawings. The invention is capable of other embodiments and of being practiced or carried out in a variety of ways. It is understood that phraseology and terminology employed herein are for the purpose of description and not of limitation.

Referring to the drawings and first to all views except FIGS. 3, 8 and 9, the basic components of a system and a method for practicing the invention are illustrated. The system consists of the following basic components: a vertically upright tubular launch barrel 10; a fully ported valve 12; an upright tubular receiving chamber 14; a removable cover 16; a fluid supply conduit 18; a fluid control valve 20; a pressure relief conduit 22; a pressure relief valve 24; and a reducing ell 26. The function of the system made up of these basic components 10 through 26 is to launch a pipeline pig, exemplified by a sphere pig 28, into a pipeline 30. Pipeline 30 is indicated in a general way, that is the pipe 30 extends from the launcher and communicates from a pipeline in such a way that a sphere or other type of pipeline pig that is passed through conduit 18 enters the pipeline and is thereafter carried along by fluid flow within the pipeline. Pipeline 30 is not considered to be an element of the combination of elements making up the launcher.

Pictured, in FIG. 1, next to the pig launcher exemplified by the basic elements 10 through 28, is a platform 32 accessed by stairs 34 protected by guardrails 36. Platform 32, stairs 34 and guardrails 36 are not a part of the pig launcher of this invention but illustrate a convenient way of making use of the invention to launch a pig exemplified by spherical pig 28 shown resting on platform 32 as it would appear in position for an operator to place it into the pig launcher for movement into a pipeline.

Pipelines are normally buried underground and therefore typically a pipeline 30 is shown beneath the earth's surface 38. When this is the case, launch barrel 10 is typically partially underground. Launch barrel 10 has an upper end 40 that has affixed thereto a flange 42 which mates with flange 44 secured to a tubular extension 46 extending from the lower end of fully ported valve 12. Adjacent to upper end 40 launch barrel 10 has a pressure fluid inlet port 48 that is in communication with a short length pipe 50 which in turn is connected to the fluid control valve 20.

The lower end 52 of launch barrel 10 is secured, such as by welding, to the upper end 56 of reducing ell 26. The opposite end 58 of reducing ell 26 is secured to pipeline 30. The reducing ell 26 changes in internal diameter from the upper end 56 to the opposite end 58 thereby coupling launch barrel 10 to pipeline 30.

Fully ported valve 12 is a type of valve, such as a ball valve, gate valve, etc., that can be moved from a fully closed position that blocks fluid flow in either direction through the valve, to a fully open position in which the internal passageway 60 in the valve is equal or at least substantially equal to the internal diameter of launch barrel 10 and receiving chamber 14. Fully ported valve 12 may be open and closed hydraulically, electrically or manually. In the illustrated arrangement, it is closed manually by use of a hand wheel 62.

Extending from the upper end of fully ported valve 12 is an upper tubular extension 64 having a flange 66 thereon. The lower end 68 of receiving chamber 14 also has affixed thereto a flange 70. Flanges 66 and 70 are held together by bolts as is customary, and the same applies to flanges 42 and 44 by which the upper end of launch barrel 10 is attached to valve 12.

The upper end 72 of receiving chamber 14 has a tubular flange 74 that forms the base for removable cover 16. As seen in FIG. 3, flange 74 has threads 76 adjacent its upper end that threadably receives cover 16. The cover is rotatably supported by an arm 78 that pivotally extends from a bracket 80 that is attached, such as by welding, to the exterior of the cover base flange 74. Extending upwardly from cover 16 is a threaded stub 82 that is threadably received in a nut member 84 that is secured, such as by welding, to the outer end of arm 78. Cover 16 has hammer lugs 86 by which the cover is rotated and tightened. When the cover 16 is rotated in one direction, it is unscrewed from thread 76 and simultaneously the threaded stub 82 rotates in nut member 84 to elevationally position the cover. When in the elevated position (as shown in FIG. 3) the cover may be rotated by arm 78 to the position as shown in FIG. 4 so that the upper open end of cover base flange 74 is exposed. Thereby a pipeline pig, exemplified by sphere 28, can be deposited into the interior of receiving chamber 14.

A pressure relief port 90 is formed in the sidewall of receiving chamber 14, adjacent to the upper end 72 thereof and receives communication within short length pipe 92. Attached to the outer end of pipe 92 is pressure relief valve 24. When valve 24 is open, any pressure within the receiving chamber 14 is equalized with the atmosphere.

There is shown extending from pipe 92 that communicates with the interior receiving chamber 14, a pressure gauge 94, the function of which is to inform the user of the pig launcher the existence of pressure within receiving chamber 14. It is easy to see that it would be exceedingly dangerous to remove cover 16 if any significant pressure exists within receiving chamber 14. Therefore, a user can observe gauge 94 and if any pressure above atmospheric pressure exists then the pressure can easily be equalized simply by opening pressure relief valve 24.

The launcher of this disclosure can be used to launch pipeline pigs of various shapes and usages. One type of pipeline pig frequently used is called an instrument pig or "smart" pig. This type of pig has instruments and recording facilities so that information concerning the interior of a pipeline may be measured and recorded. Measurements such as bends, ovality, indentations or corrosion can be measured and recorded. FIG. 8 illustrates an example of an instrument pig 98, generically referred to as a "smart" pig. FIG. 9 illustrates a plastic or elastomeric multiple disc pig 100 that can be used to clear accumulated liquid from a gas pipeline or debris from a liquid or gas pipeline, or for batching, that is, separating one kind of liquid, such as gasoline, from a subsequently introduced different liquid, such as diesel fuel. The purpose of FIGS. 8 and 9 is to illustrate that the launcher of this disclosure is not limited to launching only a special type of pipeline pig. Obviously, when a longer pipeline pig is to be launched, such as an instrument pig as illustrated in FIG. 8, the launch barrel 10 and receiving chamber 14 must be long enough to accommodate the longer pig, and reducing ell 26 must be configured to allow the passage of such longer pig, but otherwise, the launcher functions the same regardless of the type of pig to be launched.

METHOD OF USE OF THE INVENTION

Figure 7:
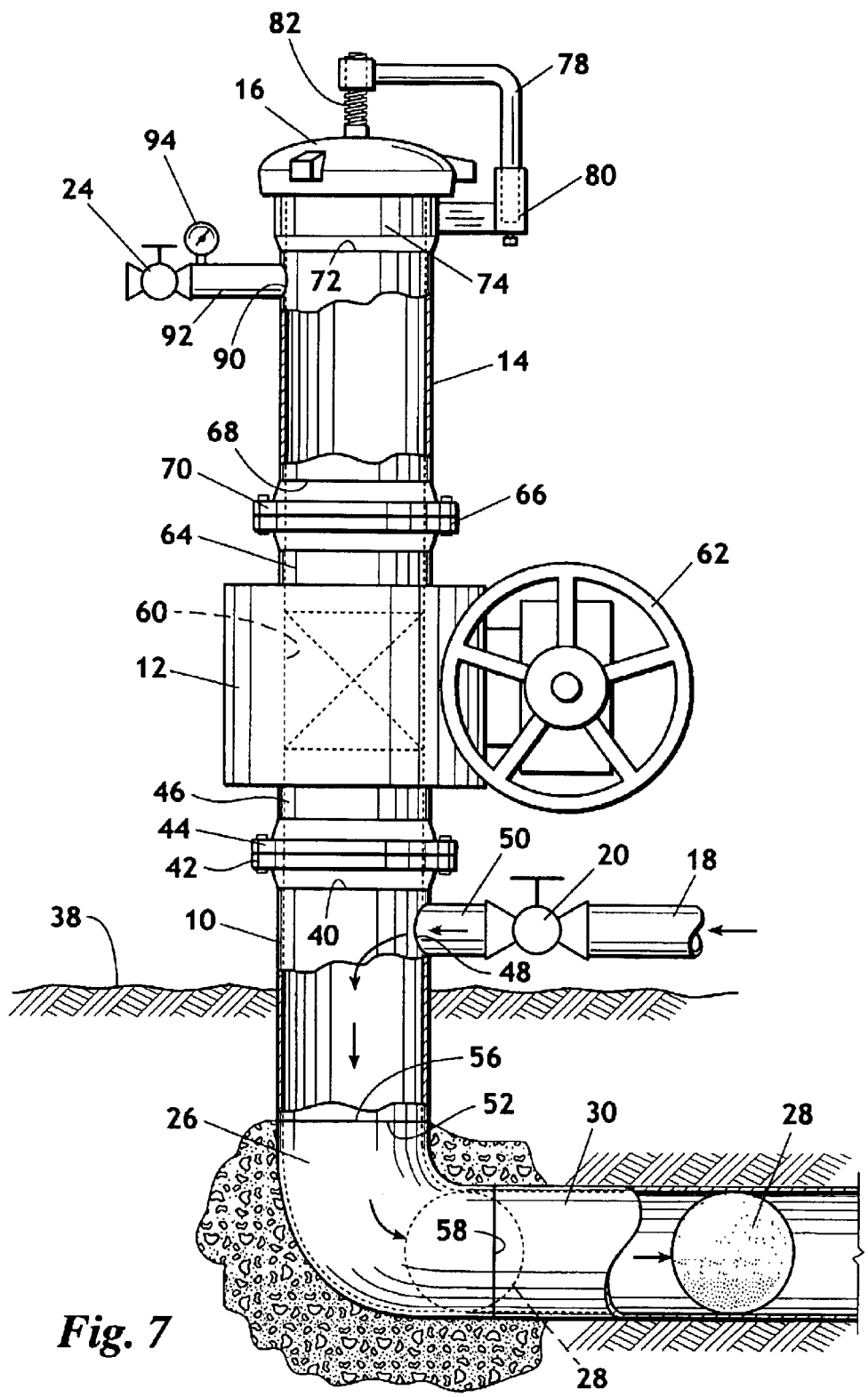
FIG. 7 shows the last stage of the process of launching a pig in which the fully ported valve is closed after a pig has passed therethrough and in which the fluid control valve is open to introduce high pressure into the upper end of the launch barrel to thereby force a pig in the reducing ell to pass into the pipeline.

When the pig launcher is not in use it will normally be closed—that is, cover 16 is in a closed position as shown in FIGS. 1, 2 and 7. Further, full port valve 12 will normally, when the launcher is not being used, be closed. To launch a pig such as sphere 28, smart pig 98 or elastomeric pig 100 into pipeline 30, valve 12 is closed, if not already closed. The next step is to ascertain from gauge 94 whether any above atmospheric pressure exists within receiving chamber 14. If such pressure exists, pressure relief valve 24 is opened to thereby equalize the pressure. Cover 16 is then unthreaded by use of hammer lugs 86 to the position as shown in FIG. 3. The cover 16 can then be swung so that it is out of the way of the open top 88 of cover base flange 74 to the position as shown in FIG. 4. This leaves the open top 88 of the receiving chamber fully exposed. A workman, making use of platform 32 and stairwell 34 can position a pig, such as sphere 28 into the launcher as shown in FIG. 4. The internal diameter of receiving chamber 14, fully ported valve 12 (when fully opened) and launch barrel 10 are all of internal diameters greater than the external diameter of the pig to be launched. Stated another way, if the pig to be launched has an external diameter D then the internal diameters of receiving chamber 14, fill port valve 12 and launch barrel 10 will all be greater than D.

Since the internal diameter of receiving chamber 14 is greater than that of the pig, the pig will drop downwardly through the barrel and come to rest as shown in dotted outline in FIG. 4 on the top of the closure member 96 within fully ported valve 12.

The next step is to replace cover 16, which is done by rotating it back so that it is in alignment with receiving chamber 14 and then rotating the cover so that it is simultaneously lowered onto the upper end of the cover base flange 74 and simultaneously screwed onto the cover base flange threads 76. The rotation can typically be done easily by manually rotating the cover until it gets near the tight position and to ensure sealed closure then a hammer can be used on the hammer lugs 86.

After removable cover 16 is in place, then to launch the pig, full port valve 12 is fully opened to thereby allow the pig to pass through the valve and into launch barrel 10. The pig moves downwardly in launch barrel 10 and into reducing ell 26 as shown in dotted outline in FIG. 7. The reducing ell 26 reduces in internal diameter and makes a 90-degree bend so that the outer end 58 of the reducing ell is of the internal diameter of pipeline 30. Since a pig must be of external diameter substantially equal to the internal diameter of a pipeline 30, a resistance is encountered between the pig and the pipeline. To force the pig into the pipeline, full port valve 12 is closed and pressurized fluid (either a liquid or gas), is communicated to the interior of launch barrel 10 when valve 20 is open. This fluid pressure which is greater than the pressure within pipeline 30, serves to force the pig into the pipeline and move it forwardly within pipeline 30 as shown in FIG. 7. After the pig is forced into the pipeline it is thereafter moved by fluid flow in the pipeline and the arrangement by which pipeline 30 connects with and passes a pig into the interior of the pipeline to be moved by fluid flow in the pipeline is a common practice in the industry and is not illustrated herein. After the pig is forced into the pipeline, fluid control valve 20 is left open until the pig reaches its destination or closed when a new pig is added.

Thereafter, the pig launching device can be left in its existing state or it can, whenever desired, be reloaded with a pig ready to be launched when required by repeating the steps of neutralizing pressure within receiving chamber 14, and opening the cover followed by inserting a pig and repositioning the covering in the top of receiving chamber 14.

An important advantage of the pig launcher as illustrated and described herein is that it does not require any mechanical equipment such as a ram, a physical release or any other mechanism to launch a pipeline pig. Further, the loading of a pig is simple and expedient and this advantage is attained by the vertical position of the launch barrel, the fully ported valve and the receiving chamber. Another important feature of the invention is its simplicity and economy compared to known pig launching devices available on the market today.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claims, including the full range of equivalency to which each element thereof is entitled.

What is claimed is:

1. An improved pipeline pig launcher for conveying a pig of predetermined maximum diameter "D" into a pipeline comprising:
   an upright launch barrel of internal diameter greater than "D" and having a lower end in communication with the pipeline;
   a valve affixed to an upper end of said launch barrel and having a passageway therethrough that can be closed or opened and when in the opened position is of internal diameter greater than "D";
   an upright pig receiving chamber connected at a lower end to said valve and in vertical alignment with said valve and launch barrel, the receiving chamber having an internal diameter at least equal to "D";
   a cover removably closing an upper end of said receiving chamber providing, when in an open position provision for insertion of a pig so that when said valve is open the pig can pass downwardly into said launch barrel and from there into the pipeline; and
   an ell fitting having a first vertically extending end connected to said launch barrel lower end and a second, horizontally extending end in communication with the pipeline.

2. A launcher for conveying a pig into a pipeline according to claim 1 including:
   a fluid entry port communicating with said launch barrel adjacent an upper end thereof; and
   a fluid supply conduit connected to said fluid entry port by which fluid may be injected into said launch barrel to assist in moving a pig within said launch barrel into the pipeline.

3. A launcher for conveying a pig into a pipeline according to claim 2 including:
   a fluid control valve in said conduit for controlling passage of fluid into said launch barrel.

4. A launcher for conveying a pig into a pipeline according to claim 1 including:
   a pressure relief port in said receiving chamber; and
   a pressure relief valve in communication with said pressure relief port that can be opened to release pressure from within said receiving chamber.

5. A launcher for conveying a pig into a pipeline according to claim 1 wherein said ell fitting is a reducing fitting wherein said first end is of diameter corresponding to the diameter of said launch barrel and said second end is of diameter corresponding to the diameter of the pipeline.

6. An improved pipeline pig launcher for conveying a pig of predetermined maximum diameter "D" into a pipeline comprising:
   an upright launch barrel of internal diameter greater than "D" and having a lower end in communication with the pipeline;
   a valve affixed to an upper end of said launch barrel and having a passageway therethrough that can be closed or opened and when in the opened position is of internal diameter greater than "D";
   an upright pig receiving chamber connected at a lower end to said valve and in vertical alignment with said valve and launch barrel, the receiving chamber having an internal diameter greater than "D";
   a cover removably closing an upper end of said receiving chamber providing, when in an open position, provision for insertion of a pig so that when said valve is open the pig passes downwardly by gravity alone into said launch barrel;
   a fluid entry port communicating with said launch barrel adjacent an upper end thereof;
   a fluid supply conduit connected to said fluid entry port by which fluid may be injected into said launch barrel to move a pig within said launch barrel into the pipeline; and
   an ell fitting having a first vertically extending and connected to said launch barrel lower end and a second, horizontally extending end in communication with the pipeline.

7. A launcher for conveying a pig into a pipeline according to claim 6 including:
   a fluid control valve in said conduit for controlling passage of fluid into said launch barrel.

8. A launcher for conveying a pig into a pipeline according to claim 6 including:
   a pressure relief port in said receiving chamber; and
   a pressure relief valve in communication with said pressure relief port that can be opened to release pressure from within said receiving chamber.

9. A launcher for conveying a pig into a pipeline according to claim 6 wherein said ell fitting is a reducing fitting wherein said first end is of diameter corresponding to the diameter of said launch barrel and said second end is of diameter corresponding to the diameter of the pipeline.

* * * * *